United States Patent
Jolley et al.

(12) 
(10) Patent No.: US 6,323,803 B1
(45) Date of Patent: Nov. 27, 2001

(54) SYSTEM AND METHOD FOR INCREMENTAL BROADCAST OF GPS NAVIGATION DATA IN A CELLULAR NETWORK

(75) Inventors: Edward Vincent Jolley, Durham; Leland Scott Bloebaum, Cary, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/371,430

(22) Filed: Aug. 10, 1999

(51) Int. Cl.⁷ ............................. H04B 7/185; G01S 5/02
(52) U.S. Cl. ........................ 342/357.03; 701/215
(58) Field of Search .................. 342/357.03, 357.02; 701/215

(56) References Cited

U.S. PATENT DOCUMENTS

| | | |
|---|---|---|
| 5,365,450 | 11/1994 | Schuchman et al. . |
| 5,828,336 | 10/1998 | Yunck et al. . |
| 5,913,170 | 6/1999 | Wortham . |
| 6,084,544 * | 7/2000 | Camp, Jr. ............... 342/357.15 |
| 6,104,338 * | 8/2000 | Krasner ............... 342/357.06 |
| 6,133,874 * | 10/2000 | Krasner ............... 342/357.15 |

FOREIGN PATENT DOCUMENTS

| | | |
|---|---|---|
| WO 98/25157 | 6/1998 | (WO) . |
| WO 00/10028 | 2/2000 | (WO) . |

\* cited by examiner

Primary Examiner—Theodore M. Blum
(74) Attorney, Agent, or Firm—Coats & Bennett, P.L.L.C.

(57) ABSTRACT

A system for broadcasting GPS assistance data in a wireless communication network to mobile stations is disclosed herein. Each mobile station includes a transceiver operating in the wireless communication network and an integrated GPS receiver to make GPS positioning measurements. The system includes a GPS receiver for obtaining orbital modeling information for visible GPS satellites and DGPS correction data. A transceiver communicates with mobile stations in the wireless communication network. A broadcast controller is operatively associated with the GPS receiver and the transceiver for selectively establishing a direct point-to-point channel with select mobile stations for transferring the orbital modeling information and for periodically broadcasting the DGPS correction data on the wireless communication network to all mobile stations communicating in the wireless communication network.

13 Claims, 2 Drawing Sheets

SYSTEM AND METHOD FOR INCREMENTAL BROADCAST OF GPS NAVIGATION DATA IN A CELLULAR NETWORK

FIELD OF THE INVENTION

This invention relates to Global Positioning System (GPS) receivers and, more particularly, to a system and method for incremental broadcast of GPS navigation data in a wireless cellular network.

BACKGROUND OF THE INVENTION

Determining the geographical position of a mobile station within a wireless cellular network or other Public Land Mobile Network (PLMN) has recently become important for a wide range of applications. For example, positioning services may be desired by transport and taxi companies to determine the location of their vehicles and to improve the efficiency of dispatch procedures. In addition, for emergency calls, e.g., 911 calls, knowing the exact location of a mobile terminal may be vital in ensuring a positive outcome in emergency situations.

Furthermore, positioning services can be used to determine the location of a stolen car, to identify home zone calls which may be charged at a lower rate, to detect hot spots in a micro cell, or to provide premium subscriber services, e.g., the Where Am I service. The Where Am I service facilitates the determination of, for example, the location of the nearest gas station, restaurant, or hospital to a mobile station.

One technique for determining the geographic position of a mobile station is to use the satellite-based Global Positioning System (GPS). GPS is a satellite navigation system that provides specially coded satellite signals that can be processed in a GPS receiver to yield the position, velocity and time of a receiving unit. Four or more GPS satellite signals are needed to compute the three-dimensional locational coordinates and the time offset of a receiver clock relative to a fixed coordinate system.

The GPS system comprises twenty-four satellites (not counting spares) that orbit the Earth in approximately twelve hours. The orbital altitude of the GPS satellites (20,200 km) is such that the satellites repeat the same ground track and configuration over any point approximately once every twenty-four hours. There are six orbital planes each nominally with at least four satellites in each, that are equally spaced (i.e., 60° apart) and inclined at about 55° relative to the equatorial plane to of the Earth. This constellation arrangement ensures that between four and twelve satellites are visible to users from any point on Earth.

The satellites of the GPS system offer two levels of precision in determining the position, velocity and time coordinates at a GPS receiver. The bulk of the civilian users of the GPS system use the Standard Positioning Service (SPS) which has a 2-σ accuracy of 100 meters horizontally, ±156 meters vertically and ±340 ns time. The Precise Positioning Service (PPS) is available only to authorized users having cryptographic equipment and keys and specially equipped receivers.

Each of the GPS satellites transmits two L-band carrier signals. The L1 frequency (centered at 1575.42 MHz) carries the navigation message as well as the SPS and PPS code signals. The L2 frequency (centered at 1227.60 MHz) also carries the PPS code and is used to measure the ionospheric delay by receivers compatible with the PPS system.

The L1 and L2 carrier signals are modulated by three binary codes: a 1.023 MHz Coarse Acquisition (C/A) code, a 10.23 MHz Precise Code (P-Code) and a 50 Hz Navigational System Data Code (NAV Code). The C/A code is a pseudorandom number (PRN) code that uniquely characterizes a GPS satellite. All of the GPS satellites transmit their binary codes over the same L1 and L2 carriers. The multiple simultaneously-received signals are recovered by a Code Division Multiple Access (CDMA) correlator. The correlator in a civilian GPS receiver first recovers the C/A Code as modulated by the NAV Code. A Phase Locked Loop (PLL) circuit then separates out the C/A Code from the NAV Code. It should be emphasized that a GPS receiver first needs to determine its approximate location in order to determine which of the GPS satellites are actually visible. Conversely, a GPS receiver that knows its approximate position can acquire more quickly the signals transmitted by the appropriate GPS satellites.

The startup of a GPS receiver typically requires the acquisition of a set of navigational parameters from the navigational data signals of four or more GPS satellites. This process of initializing a GPS receiver may often take several minutes.

The duration of the GPS positioning process is directly dependent upon how much information a GPS receiver has. Most GPS receivers are programmed with almanac data, which coarsely describes the expected satellite positions for up to one year ahead. However, if the GPS receiver does not have some knowledge of its own approximate location, then the GPS receiver cannot correlate signals from the visible satellites fast enough, and therefore, cannot calculate its position quickly. Furthermore, it should be noted that a higher signal strength is needed for capturing the C/A Code and the NAV Code at start-up than is needed for continued monitoring of an already-acquired signal. It should also be noted that the process of monitoring the GPS signal is significantly affected by environmental factors. Thus, a GPS signal which may be easily acquired in the open becomes progressively harder to acquire when a receiver is under foliage, in a vehicle, or worst of all, in a building.

Recent governmental mandates, e.g., the response time requirements of the FCC Phase II E-911 service, make it imperative that the position of a mobile handset be determined accurately and in an expedited manner. Thus, in order to implement a GPS receiver effectively within a mobile terminal while also meeting the demands for fast and accurate positioning, it has become necessary to be able to quickly provide mobile terminals with accurate assistance data, e.g., local time and position estimates, satellite ephemeris and clock information (which may vary with the location of the mobile station). The use of such assistance data can permit a GPS receiver that is integrated with or connected to a mobile station to expedite the completion of its start-up procedures. It is therefore desirable to be able to send the necessary assistance GPS information over an existing wireless cellular network to a GPS receiver that is integrated with or connected to a mobile terminal.

It is presently known to provide satellite ephemeris and clock correction information to a remote GPS receiver over a radio link. Likewise, it is common in land surveying to provide Differential GPS (DGPS) corrections over a radio link to remote GPS receivers. However, none of these prior systems address the specific operation requirements of a cellular mobile station and the wireless cellular network with which it interacts.

With a GPS-equipped Mobile Station (GPS-MS), standby time and talk time are limited by battery capacity. The additional battery drain resulting from operation of the integrated GPS receiver can be substantially greater than for the basic cell phone requirements. This can undesirably limit both standby time and talk time.

Providing GPS assistance information to the GPS-MS improves the sensitivity, Time-To-First-Fix (TTFF), and power consumption of the GPS-MS compared to a stand-alone GPS receiver. However, typical GPS-MS usage scenarios pose problems related to obtaining and updating GPS assistance information from the wireless cellular network. For example, the DGPS correction data is very time sensitive and requires frequent updates, which places a burden on the facilities of the wireless cellular network. Also, once new ephemeris and clock correction data is available for a satellite, all GPS-MS for which the satellite is visible require the new assistance as soon as possible in order to maintain a high degree of position accuracy. Timely delivery of these updates can place significant burden on the facilities of the wireless cellular network.

The present invention is directed to overcoming one or more of the problems discussed above in a novel and simple manner.

SUMMARY OF THE INVENTION

In accordance with the invention there is provided a system and method for incremental broadcast of GPS assistance data in a wireless cellular network. This system and method provides the navigation data in a timely manner without placing undue burden on wireless cellular network resources.

Broadly, there is disclosed in accordance with one aspect of the invention the method of broadcasting Global Positioning System (GPS) assistance data in a wireless communication network to mobile stations. Each mobile station includes a transceiver operating in the wireless communication network and an integrated GPS receiver to make GPS positioning measurements. The method comprises the steps of establishing a direct point-to-point channel with a select mobile station; transferring orbital modeling information on the point-to-point channel to the select mobile station for visible GPS satellites; and broadcasting GPS correction data on the wireless network to all mobile stations communicating in the wireless communication network.

It is a feature of the invention that the transferring step includes the step of transferring GPS satellite and clock correction information or GPS satellite almanac data.

It is another feature of the invention that the broadcasting step comprises the step of broadcasting DGPS correction data.

It is a further feature of the invention to provide the step of updating assistance data by broadcasting data representing updated orbital modeling information to all mobile stations communicating in the wireless communication network. The updating step comprises parsing the data representing updated orbital modeling information and selectively adding the parsed data to unused portions of broadcast messages. The updated orbital modeling information is compared to existing orbital modeling information to determine deviations for currently visible satellites. The parsing step comprises parsing the deviations for currently visible satellites.

It is an additional feature of the invention that the updating step comprises compressing the data representing updated orbital modeling information. The data is compressed by determining deviations for currently visible satellites.

There is disclosed in accordance with another aspect of the invention the method of incrementally broadcasting updated GPS assistance data in a wireless communication network to mobile stations, each mobile station including a transceiver operating in the wireless communication network, and an integrated GPS receiver to make GPS measurements, the mobile stations having past orbital modeling information for recently visible GPS satellites. The method comprises the steps of periodically receiving current orbital modeling information for currently visible satellites; comparing the received current orbital modeling information to the past modeling information and responsive to any deviations developing updated orbital modeling information; and broadcasting updated orbital modeling information on the wireless communication network to all mobile stations communicating in the wireless communication network.

There is disclosed in accordance with yet another aspect of the invention a system for broadcasting GPS assistance data in a wireless communication network to mobile stations. Each mobile station operates in the wireless communication network and includes an integrated GPS receiver to make GPS positioning measurements. The system includes a GPS receiver for obtaining orbital modeling information for visible GPS satellites and GPS correction data. A transceiver communicates with mobile stations in the wireless communication network. A broadcast controller is operatively associated with the GPS receiver and the transceiver for selectively establishing a direct point-to-point channel with select mobile stations for transferring the orbital modeling information and for periodically broadcasting the GPS correction data on the wireless communication network to all mobile stations communicating in the wireless communication network.

It is a feature of the invention that the orbital modeling information comprises GPS satellite ephemeris and clock correction information.

It is another feature of the invention that the orbital modeling information comprises GPS satellite almanac data.

It is a further feature of the invention that the GPS correction data comprises DGPS correction data.

It is an additional feature of the invention that the broadcast controller updates assistance data by broadcasting data representing updated orbital modeling information to all mobile stations communicating in the wireless communication network. The updating comprises parsing the data representing updated modeling information and selectively adding the parsed data to unused portions of broadcast messages. The broadcast controller compares updated orbital modeling information to existing orbital modeling information to determine deviations for currently visible satellites. The broadcast controller parses the deviations for currently visible satellites.

It is a further feature of the invention that the broadcast controller compresses the data representing updated orbital modeling information. The data is compressed by determining deviations for currently visible satellites.

Further features and advantages of the invention will be readily apparent from the specification and from the drawings.

DETAILED DESCRIPTION OF THE INVENTION

Figure 1:
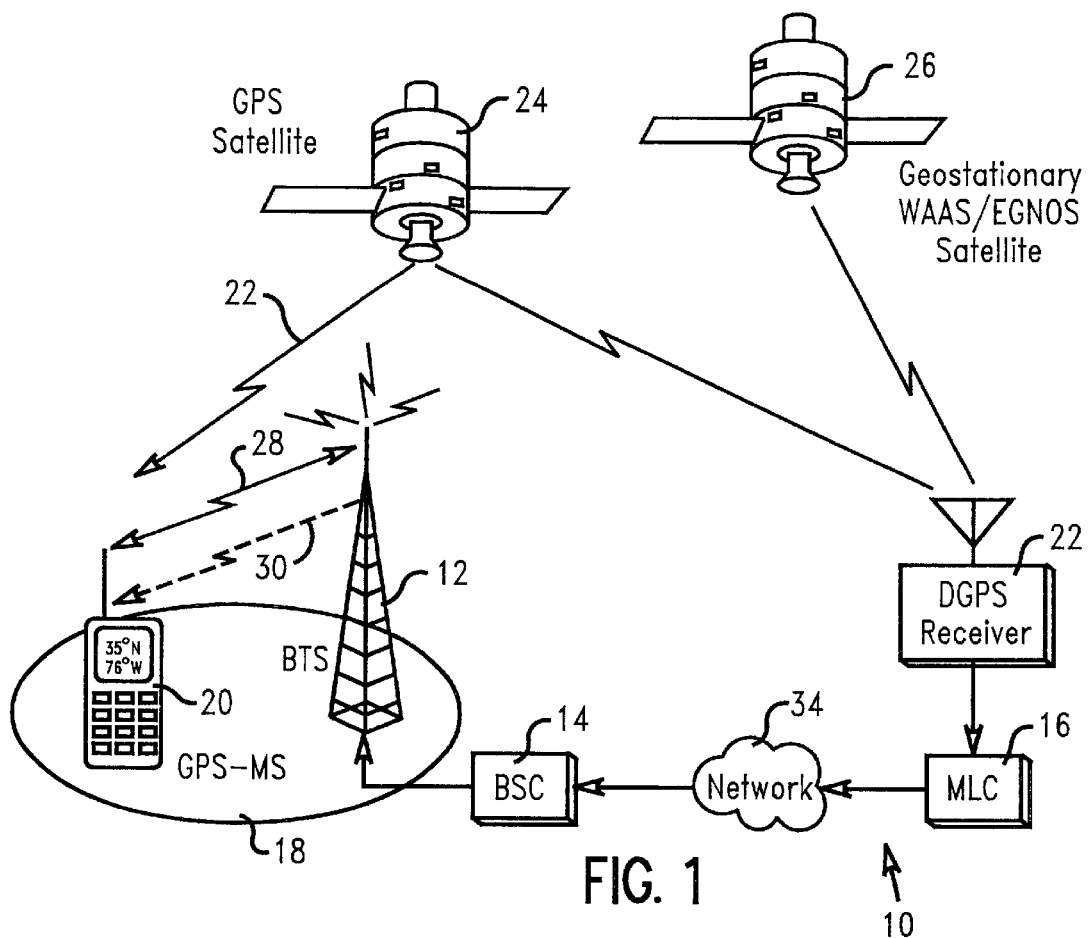
FIG. 1 is a block diagram of a system for broadcasting GPS assistance data in a wireless communication network in accordance with the invention.

Referring to FIG. 1, a block diagram of a wireless communication network system 10 utilizing assisted-GPS positioning is illustrated. The system and method according to the invention are described relative to the GSM cellular standard. Nevertheless, those skilled in the art will recognize that the invention can be applied to other cellular systems such as, for example, TDMA (ANSI-136) and CDMA (cdmaOne), and also to non-cellular wireless communication systems, such as satellite telephones or land mobile radios.

The wireless communication network system 10 includes a Base Transceiver Station (BTS) 12 connected to a Base Station Controller (BSC) 14. The BSC communicates with a Mobile Location Center (MLC) 16 via signaling through the cellular system network, represented by a cloud 34. The BTS 12 is the radio portion of the system 10 and is responsible for transmitting and receiving radio signals used in a particular cell 18. The BSC 14 controls the resources of one or more BTSs, such as the BTS 12, including the broadcast capabilities as described below. The MLC 16 is responsible for determining Global Positioning System (GPS) assistance information for delivery to any GPS-equipped Mobile Stations (GPS-MS) in the area that it serves, such as a GPS-MS 20 shown in the cell 18. This can be done through a local Differential GPS (DGPS) receiver 22 that is co-located with the MLC 16. The DGPS receiver 22 provides corrections as well as navigation messages from the satellites that are visible to it, such as a satellite 24. The satellite 24 could be any Satellite Based Augmentation System (SBAS) satellite that provides a GPS-like ranging signal. For purposes of this application, the satellite 24 is described as a GPS satellite. The DGPS receiver 22 also can use information from other SBAS satellites, such as WAAS or EGNOS geostationary satellites 26 as a redundant source for DGPS corrections.

The GPS-MS 20 comprises a typical mobile station (also called a wireless telephone, cellular telephone, or cell phone) having a cellular transceiver for sending and receiving radio signals between it self and the wireless communication network system 10. The GPS-MS 20 is also equipped with an integrated GPS receiver for receiving composite signals from visible GPS satellites, such as the satellite 24. The GPS-MS 20 is programmed to make GPS positioning measurements using the composite signals and navigation assistance data received from the wireless communication network system 10.

As is apparent, the network system 10 typically includes numerous BTSs, one for each cell, and likewise numerous BSCs. The number of GPS-MSs depends on the number of users utilizing the network system at any given time. However, for simplicity the features of the system and method according to the invention are described relative to the illustrated BTS 12, BSC 14 and GPS-MS 20.

The information-bearing channels, or "bearers", of the wireless communication network system 10 can be divided into three categories. The first is a point-to-point channel, as shown at 28. With a point-to-point channel 28 a dedicated logical or physical channel exists between the GPS-MS 20 and the BSC 14, or a mobile switching center (not shown). Since the channel is dedicated, it must be established between the GPS-MS 20 and the network entity prior to use, and then released after completion of the communication. These procedures require processing capacity from one or more network entities and, as such, are not "free-of-charge".

The second type of channel is a point-to-multipoint channel, as illustrated at 30. With a point-to-multipoint channel, the wireless communication network system 10 broadcasts information to all mobile stations in a certain geographic area. No logical channel is used for broadcast operation, so establishment and release procedures are not required. However, a controlling entity must determine the broadcast contents for each point-to-multipoint channel 30. For instance, in the GSM system the BSC 14 configures the Broadcast Control CHannel (BCCH) transmitted by the BTS 12 in each cell served by the BSC 14.

A third type of channel is a multipoint-to-point where multiple mobile stations transmit on a common channel. One example of this type of channel in the GSM system is the Random Access Channel (RACH), which is used by all mobile stations in a cell area to request a dedicated connection to the network.

The types of GPS assistance data can be divided into two categories. The first is orbital modeling information for visible satellites. The second is DGPS corrections. The orbital modeling information consists of navigation information including satellite ephemeris and clock corrections, or almanac data. This data is relatively large, and may be on the order of approximately 5000 bits for ten satellites. The navigation information requires infrequent updates, approximately every two hours for currently visible satellites. The GPS satellite almanac data is updated much less frequently. If navigation information is provided only for satellites visible at a reference location, for example, the serving BTS 12, then updates are also required when a new satellite becomes visible. The navigation information is needed for the GPS-MS 20 to calculate its own position. Providing the navigation information from the network system 10 means that the GPS-MS 20 does not have to demodulate it from the respective GPS satellite signals, such as the signal 32 in FIG. 1.

The DGPS corrections are used to mitigate atmospheric, orbital, and Selective Availability (SA) errors in the ranges to their respective satellites that are measured by the GPS-MS 20 and used for position computation. This data is relatively small, but requires frequent updates, on the order of 30 seconds or less, due to the time-varying nature of the SA degradation. The DGPS corrections improve the horizontal position accuracy of the GPS-MS 20 from 50 m (RMS) to 5–10 m (RMS), which is important for applications such as personal navigation.

The broadcast capacity of each cell or BTS is relatively limited. The capacity must be used for information other than GPS assistance. For example, the BCCH must provide information to aid handoff to neighbor cells. Therefore, it is not practical to deliver the larger navigation assistance over a broadcast bearer.

In order to satisfy the above requirements, the wireless communication network system 10 in accordance with the invention utilizes several procedures for providing GPS assistance information to the GPS-MS 20. The first procedure is that when the GPS-MS 20 powers on, it uses a dedicated point-to-point channel 28 to request and receive both orbital modeling information and DGPS correction assistance from the network 10. This dedicated channel may be established specifically for this purpose, or a logical channel established for another purpose may be used for this communication between the GPS-MS 20 and the network system 10. The use of the point-to-point channel 28 provides fast delivery which enables the GPS-MS 20 to quickly compute its position.

Meanwhile, the DGPS correction data is broadcast on each cell's BCCH or another broadcast bearer. The DGPS broadcast data for each cell, such as the cell 18, is updated every thirty seconds or less by the BSC 14. Broadcast is advantageous, since it allows fast delivery of the DGPS corrections to all GPS-MS at once. This is especially important due to the short duration of validity for the correction data.

The above two procedures address the primary operational scenarios. However, a problem occurs when the orbital modeling information, particularly the navigation information, must be updated for all GPS-MS in a geographic region, for example, a cell. One example of this is when a new satellite becomes visible. Point-to-point delivery to all GPS-MS in the cell is not practical, nor is using additional broadcast capacity.

This problem is solved in accordance with the invention by parsing the updated information and adding it to unused portions of broadcast messages. Particularly, most network signaling protocols have a so-called Protocol Data Unit (PDU) in which all messages must be multiples of a certain size. For example, the PDUs for the GSM Short Message Service Cell Broadcast (SMS-CB) are 82 bytes, or 656 bits. If the actual message content is less than this length, then the protocol adds filler data to bring it up to the PDU size. In accordance with the invention, if the broadcast DGPS correction data, discussed above, is less than 1 PDU, then the unused capacity is filled with updated navigation data. In this manner, all GPS-MS in the cell 18 can receive the updated navigation data without having to occupy dedicated point-to-point channels 28 and other network resources, such as an MSC or BSC.

In accordance with the invention, there are two options for sending the navigation data updates in the broadcast DGPS message. The first is to directly send the ephemeris, clock corrections, etc. for each of the satellite(s) affected by the update by parsing the data to fill the unused broadcast capacity. The second option is to directly send information for one or more newly visible satellites, but only to send the expected navigation parameter deviations for currently visible satellites. With past broadcast updates stored, the GPS-MS 20 is then able to apply the deviations to existing information and determine the most recent navigation data updates. This allows the data to be more quickly distributed to the GPS-MS 20.

Once the MLC 16 has captured the DGPS correction data from the DGPS receiver 22, or another external source, it sends this data to the BSC 14 via the network 34. Alternatively, the MLC 16 may be co-located with the BSC 14. Preferably, the MLC 16 updates the DGPS correction data periodically, such as every thirty seconds or less. After it receives each update, the BSC 14 sends this data to its internal GPS assistance broadcast controller 36, see FIG. 2.

Figure 2:
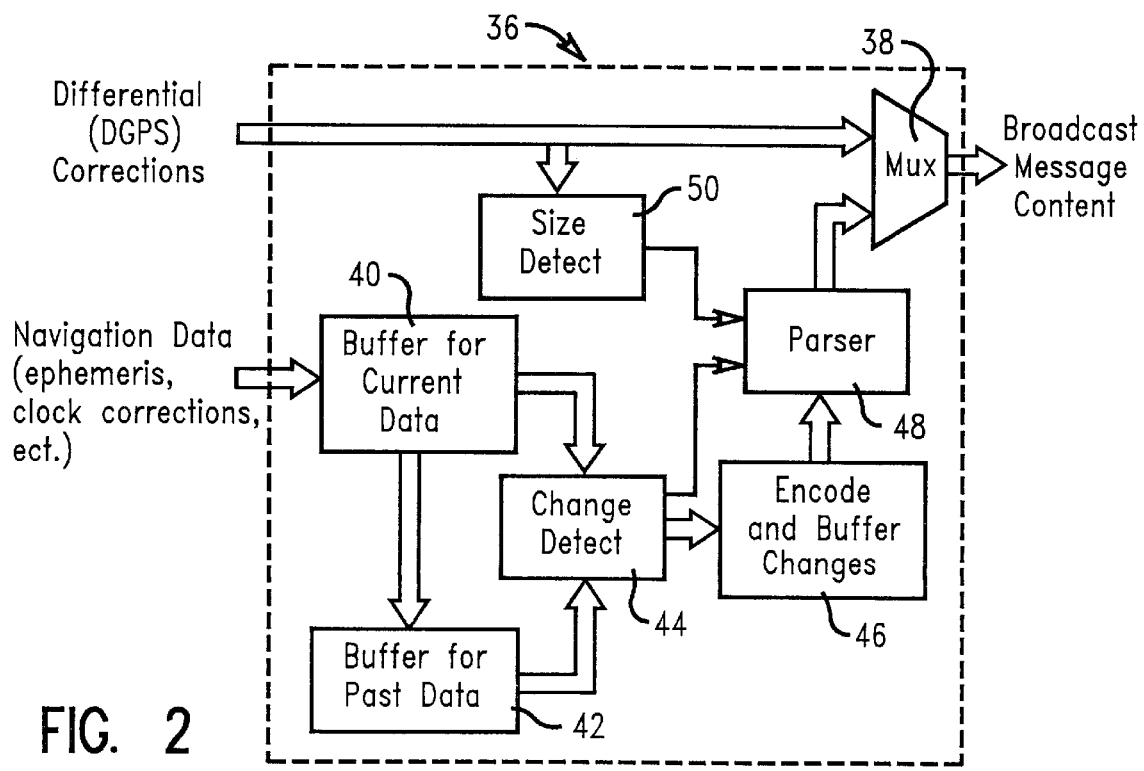
FIG. 2 is a block diagram of a GPS assistance broadcast controller for the system of FIG. 1.

Referring to FIG. 2, the broadcast controller 36 includes a multiplexer 38 that receives the DGPS correction data from the MLC 16. The BSC 14 also receives the GPS navigation data from the MLC 16. This data comes from the DGPS receiver 22 or perhaps from an external source (not shown). Updates to the navigation data occurs when the GPS satellites change their respective navigation messages or possibly when a new satellite comes into view. After receiving this navigation data, the BSC 14 sends it to the internal broadcast controller 36, where it is stored in a buffer 40 for current data. The buffer 40 is compared to a buffer 42 which stores past data using a change detect block 44. If there are no navigation data differences for a currently visible satellite, then no additional broadcast message content need be generated for this satellite. If there are changes for a currently visible satellite, then the broadcast controller 36 calculates deviation terms that relate the preceding set of navigation parameters to the new set of navigation parameters. These deviation terms are transferred to a block 46 that encodes and buffers the changed data and parses it into the unused portions of the point-to-multipoint broadcast messages using a parser 48. The parser 48 is also connected to a size detect block 50 that receives the DGPS correction data. The size detect block determines if the broadcast DGPS correction data is less than one PDU. The size detect block 50 then instructs the parser 48 as to the unused capacity that can be filled with updated navigation data. The parser 48 then supplies the parsed navigation data to the multiplexer 38 for filling the unused capacity of the broadcast DGPS correction data, which is output as broadcast message content. This allows the navigation data to be distributed more quickly to all of the GPS-MS communicating in the wireless communication network 10.

Figure 3:
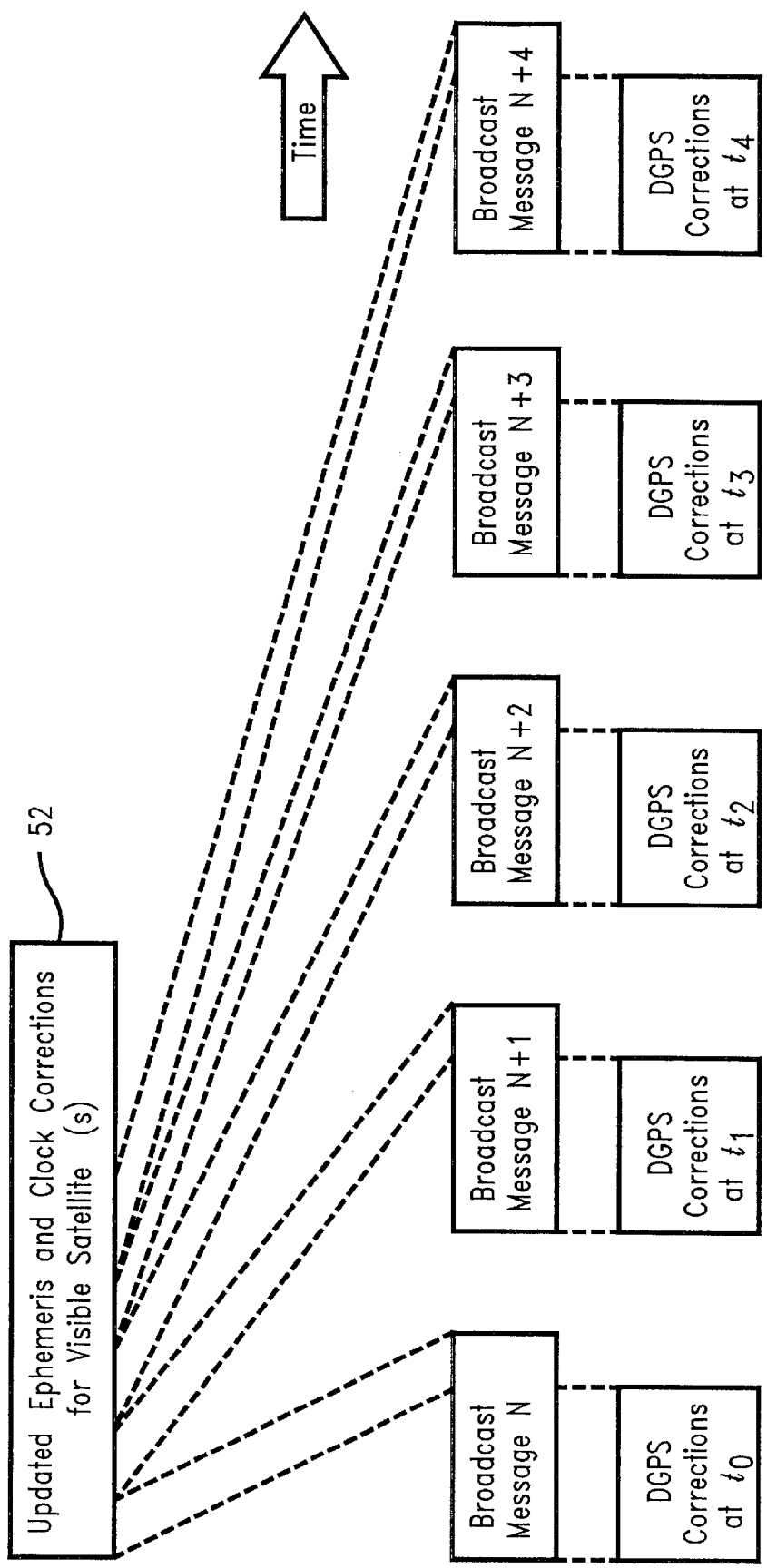
FIG. 3 is a timing diagram illustrating parsing of updated GPS navigation information implemented by the controlled of FIG. 2.

As is apparent, if a satellite is newly visible and no past data is buffered at the block 42, then the navigation data is simply passed along and parsed in its standard form. FIG. 3 shows a time line of how the updated navigation information, illustrated at a block 52, is parsed and added to broadcast messages labeled N, N+1, N+2, N+3 and N+4, along with respective DGPS correction data at times $t_0$, $t_1$, $t_2$, $t_3$ and $t_4$.

One benefit of transferring only deviation terms for currently visible satellites is message compression. As the size of individual navigation updates is reduced, the effective delivery rate of a sequence of navigation updates can be increased. Alternatively, the effective delivery rate can be maintained while the conserved bits are utilized for other purposes. For instance, bits that indicate the precise relationship between the respective time references of the wireless cellular network system and the GPS can be broadcast periodically using these conserved bits. It is known to those skilled in the art that knowledge of this relationship is a core component of any effective GPS assistance scheme. These timing relationships are described in Bloebaum et al. application No. 09/264,120, filed Mar. 8, 1999, and assigned to the assignee of the present application.

It is anticipated that a two- to threefold compression factor between sequential 2-hour navigation fit span intervals are feasible. For instance, the Issue-Of-Data terms for Clock and Ephemeris (IODC & IODE) can be reduced from a combined 18 bits to just 1–2 bits, which is enough to indicate occurrence of a change. Likewise, the time-of-clock and time-of-ephemeris ($t_{OC}$ and $t_{OE}$) can be reduced from 16 bits each to less than 8 bits each.

Furthermore, other orbital parameters lend themselves to compression because the navigation data stored in the GPS-MS 20 from the preceding update contain their corresponding higher order derivatives. The conventional set of terms $\{af_0, af_1, I_0, \Omega_0, M_0, \omega\}$ can be projected precisely two hours forward by employing the higher order derivatives contained in the set $\{af_1, af_2, dI/dt, d\Omega/dt, \Delta n\}$. The differences between the precisely projected estimates and their associated terms from a new update are minimal. This is especially true since it is well known that pseudorange pairs produced by successive fit-span updates (two-hour lag) differ by less than one meter. Since this set of six terms accounts for a total of 166 clock/ephemeris bits, a four-fold compression of this subset could yield a reduction of approximately 120 bits.

For the remaining terms, $\{af_2, dI/dt, d\Delta/dt, \Delta n, e, A^{1/2}\}$ and the six harmonic correction amplitudes, determining the range of expected span-to-span parameter deviations is not so straightforward. Such determinations require some empirical investigation of the span-to-span deviations exhibited in archived navigation messages. However, one must consider that the respective parameters for two successive fit-span intervals are derived essentially from the same continuous 4-week set of control segment observation data. Thus, junctions between successive fit-span parameter sets are inherently smooth due to the excessively long observation window utilized. If the 222 bits required by these remaining terms can be cut in half and the aforementioned reductions are made, a three-fold compression is possible.

As shown in FIG. 1, the GPS-MS 20 receives both the point-to-point and point-to-multipoint channels that are transmitted by the serving BTS 12. When the GPS-MS 20 powers on and has no valid navigation data, it may request the data directly from the MLC 16 on a point-to-point channel. However, if the GPS-MS 20 already has valid navigation data then it may listen to the point-to-multipoint channel for new data while using its existing data.

Thus, in accordance with the invention, there is illustrated a system and method for incremental broadcast of GPS assistance data in a wireless communication system, such as a cellular network system, to provide frequent updates of time sensitive information while minimizing burden on the wireless communication network.

We claim:

1. A method of broadcasting Global Positioning System (GPS) assistance data in a wireless communication network to a mobile stations, each mobile station comprising a transceiver operating in the wireless communication network and an integrated GPS receiver to make GPS positioning measurements, the method comprising the steps of:

establishing a direct point-to-point channel with a select mobile station;

transferring orbital modeling information on the point-to-point channel to the select mobile station for visible GPS satellites;

broadcasting GPS correction data on the wireless communication network to all mobile stations communicating in the wireless communication network; and updating assistance data by broadcasting data representing updated orbital modeling information to all mobile stations communicating in the wireless communication network, said updating comprising parsing the data representing updated orbital modeling information and selectively adding the parsed data to unused portions of broadcast messages.

2. The method of claim 1 wherein the transferring step includes the step of transferring GPS satellite ephemeris and clock correction information.

3. The method of claim 1 wherein the transferring step includes the step of transferring GPS satellite almanac data.

4. The method of claim 1 wherein the broadcasting step comprises the step of broadcasting DGPS correction data.

5. The method of claim 1 further comprising the step of comparing updated orbital modeling information to existing orbital modeling information to determine deviations for currently visible satellites.

6. The method of claim 5 wherein the parsing step comprises parsing the deviations for currently visible satellites.

7. The method of claim 1 wherein the updating step comprises compressing the data representing updated orbital modeling information.

8. The method of claim 7 wherein the updating step compresses the data by determining deviations for currently visible satellites.

9. A method of incrementally broadcasting updated Global Positioning System (GPS) assistance data in a wireless communication network to mobile stations, each mobile station comprising a transceiver operating in the wireless communication network and an integrated GPS receiver to make GPS positioning measurements, the mobile stations having past orbital modeling information for recently visible GPS satellites, the method comprising the steps of:

periodically receiving current orbital modeling information for currently visible satellites;

comparing the received current orbital modeling information to the past orbital modeling information and responsive to any deviations developing updated orbital modeling information; and broadcasting updated orbital modeling information on the wireless communication network to all mobile stations communicating in the wireless communication network, said broadcasting comprising parsing data representing the updated orbital modeling information and selectively adding the parsed data to unused portions of broadcast messages.

10. The method of claim 9 wherein the parsing step comprises parsing the deviations for currently visible satellites.

11. The method of claim 9 wherein the broadcasting step comprises compressing data representing the updated orbital modeling information.

12. The method of claim 11 wherein the broadcasting step compresses the data by determining the deviations for currently visible satellites.

13. The method of claim 9 further comprising the step of adding data describing a relationship between respective time references of the wireless communication network and the GPS to unused portions of broadcast messages.

* * * * *